United States Patent
Lan et al.

(10) Patent No.: US 10,375,754 B2
(45) Date of Patent: Aug. 6, 2019

(54) RFFE FOR DUAL CONNECTIVITY

(71) Applicant: T-Mobile USA, Inc., Bellevue, WA (US)

(72) Inventors: Wei-Ming Lan, Morrisville, NC (US); Ming Shan Kwok, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 15/901,453

(22) Filed: Feb. 21, 2018

(65) Prior Publication Data

US 2019/0090297 A1  Mar. 21, 2019

Related U.S. Application Data

(60) Provisional application No. 62/571,464, filed on Oct. 12, 2017, provisional application No. 62/559,997, filed on Sep. 18, 2017.

(51) Int. Cl.
*H04W 88/06* (2009.01)
*H04W 76/16* (2018.01)
(Continued)

(52) U.S. Cl.
CPC ....... *H04W 76/16* (2018.02); *H04W 72/0406* (2013.01); *H04W 84/042* (2013.01); *H04W 88/06* (2013.01); *H04W 88/08* (2013.01)

(58) Field of Classification Search
CPC . H04B 1/40; H04B 1/50; H04B 1/005; H04B 1/0064; H04W 76/16;
(Continued)

(56) References Cited

U.S. PATENT DOCUMENTS

2004/0121753 A1* 6/2004 Sugar ............... H04B 1/005
                                                    455/333
2010/0226292 A1* 9/2010 Gorbachov ......... H04B 1/48
                                                    370/280
(Continued)

FOREIGN PATENT DOCUMENTS

WO  WO2013003441 A1  1/2013
WO  WO2014182714     11/2014
WO  WO2016012153 A1  1/2016

OTHER PUBLICATIONS

Antionioli et al, "Dual Connectivity for LTE-NR Cellular Networks", Brazilian Syposium on Telecommunications and Signal Processing, Sep. 6, 2017, pp. 171-175.
(Continued)

*Primary Examiner* — Andrew Wendell
(74) *Attorney, Agent, or Firm* — Lee & Hayes, P.C.

(57) ABSTRACT

A radio frequency front end (RFFE) is configured to support dual connectivity communications, in which two different radio access technologies such as LTE and NR are used simultaneously for uplink communications from a wireless communications device to a base station. The RFFE has two channels and two respectively associated antennas. The first channel transmits an NR signal from the first antenna. The second channel transmits an LTE signal from the second antenna. For reception, the first channel produces a main NR receive signal and LTE diversity signal. The second channel produces a main LTE receive signal and an NR diversity signal.

20 Claims, 4 Drawing Sheets

(51) Int. Cl.
*H04W 72/04* (2009.01)
*H04W 84/04* (2009.01)
*H04W 88/08* (2009.01)

(58) Field of Classification Search
CPC . H04W 72/0406; H04W 88/06; H04W 88/08;
H04W 84/042
See application file for complete search history.

(56) References Cited

U.S. PATENT DOCUMENTS

| | | | |
|---|---|---|---|
| 2011/0234335 A1* | 9/2011 | Khlat | H04B 1/406 |
| | | | 333/132 |
| 2013/0052964 A1* | 2/2013 | Husted | H04B 17/11 |
| | | | 455/73 |
| 2014/0376417 A1* | 12/2014 | Khlat | H04L 5/001 |
| | | | 370/277 |
| 2015/0256241 A1* | 9/2015 | Jia | H04B 7/0452 |
| | | | 370/330 |
| 2016/0112073 A1* | 4/2016 | Lum | H04B 1/0057 |
| | | | 370/297 |
| 2017/0163293 A1 | 6/2017 | Lee et al. | |
| 2018/0294858 A1* | 10/2018 | Pehlke | H04B 1/0057 |

OTHER PUBLICATIONS

PCT Search Report and Written Opinion dated Nov. 12, 2018 for PCT Application No. PCT/US2018/044537, 14 pages.

\* cited by examiner

RFFE FOR DUAL CONNECTIVITY

CROSS-REFERENCE TO RELATED APPLICATION

This application claims priority to, commonly owned U.S. Provisional Patent Application No. 62/571,464, filed on Oct. 12, 2017, and titled "Radio Frequency Front End Architecture for Intraband LTE and NR Coexistence," and U.S. Provisional Patent Application No. 62/559,997, filed Sep. 18, 2017, and titled "Radio Frequency Front End Architecture for Intra-Band LTE and NR Coexistence," which are herein incorporated by reference in their entirety.

BACKGROUND

Cellular communication devices use various network radio access technologies to communicate wirelessly with geographically distributed base stations. Long-Term Evolution (LTE) is an example of a widely implemented radio access technology, which is used in $4^{th}$ Generation (4G) communication systems. New Radio (NR) is a newer radio access technology that is used in $5^{th}$ Generation (5G) communication systems. Standards for LTE and NR radio access technologies have been developed by the 3rd Generation Partnership Project (3GPP) for use by wireless communication carriers within cellular communication networks.

A communication protocol defined by the 3GPP, referred to as Non-Standalone (NSA), specifies the simultaneous use of LTE and NR for communications between a mobile device and a communications network. Specifically, NSA uses Dual Connectivity (DC), in which a user equipment (UE) uses both an LTE carrier and an NR carrier for uplink transmissions to corresponding 4G and 5G base stations. The LTE carrier is used for control-plane messaging and for user-plane communications. The NR carrier is used for additional user-plane bandwidth. In a scenario such as this, the LTE carrier is said to "anchor" the communication session.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Described herein are components and techniques for processing dual-connectivity radio frequency (RF) signals, such as RF signals that might be used for operating in a Non-Standalone mode, in which a data uplink uses both 4G and 5G radio access technologies. The components and techniques may be used by or within a wireless telecommunications device, for example.

In a described embodiment, uplink data is divided into a first portion that will be transmitted using a 4th Generation (4G) radio access technology and a second portion that will be transmitted using 5th Generation 5G radio access technology. Long-Term Evolution (LTE) is an example of 4G radio access technology. New Radio (NR) is an example of 5G radio access technology.

The telecommunication device has a radio frequency front end (RFFE) that supports simultaneous LTE and NR communications. The RFFE also supports antenna diversity for receiving LTE and NR signals.

The RFFE has first and second channels. Each channel is associated with a respective antenna. Each channel has a transmit path and a receive path. The transmit path of the first channel is used to transmit an LTE signal. The transmit path of the second channel is used to transmit an NR signal.

The receive path of each channel receives a signal, from an antenna, that is filtered and amplified to produce both an LTE signal and an NR signal. More specifically, the receive path of the first channel filters the antenna signal to produce an LTE receive signal that is used as the main signal of LTE. The receive path of the second channel filters its antenna signal to produce an LTE receive signal that is processed as the diversity signal of LTE. The receive path of the first channel also filters the antenna signal to produce an NR receive signal that is processed as the diversity signal of NR. The receive path of the second channel filters the antenna signal to produce an NR receive signal that is processed as the main signal of NR.

The described configuration reduces the potential for intra-modulation distortion by avoiding the mixing of RF transmit signals. The configuration may be particularly useful in situations where LTE and NR signals have frequencies that are close to each other and/or are within the same frequency band.

Although the techniques are discussed in the context of LTE and NR radio access technologies, the techniques described herein may also be used with different network types, standards, and technologies. The techniques may generally be used for various types of carrier aggregation (CA), in which data represented by multiple RF carriers is aggregated to form a single data stream. For example, certain 4G/LTE systems may use carrier aggregation and may benefit from the disclosed techniques.

Figure 1:
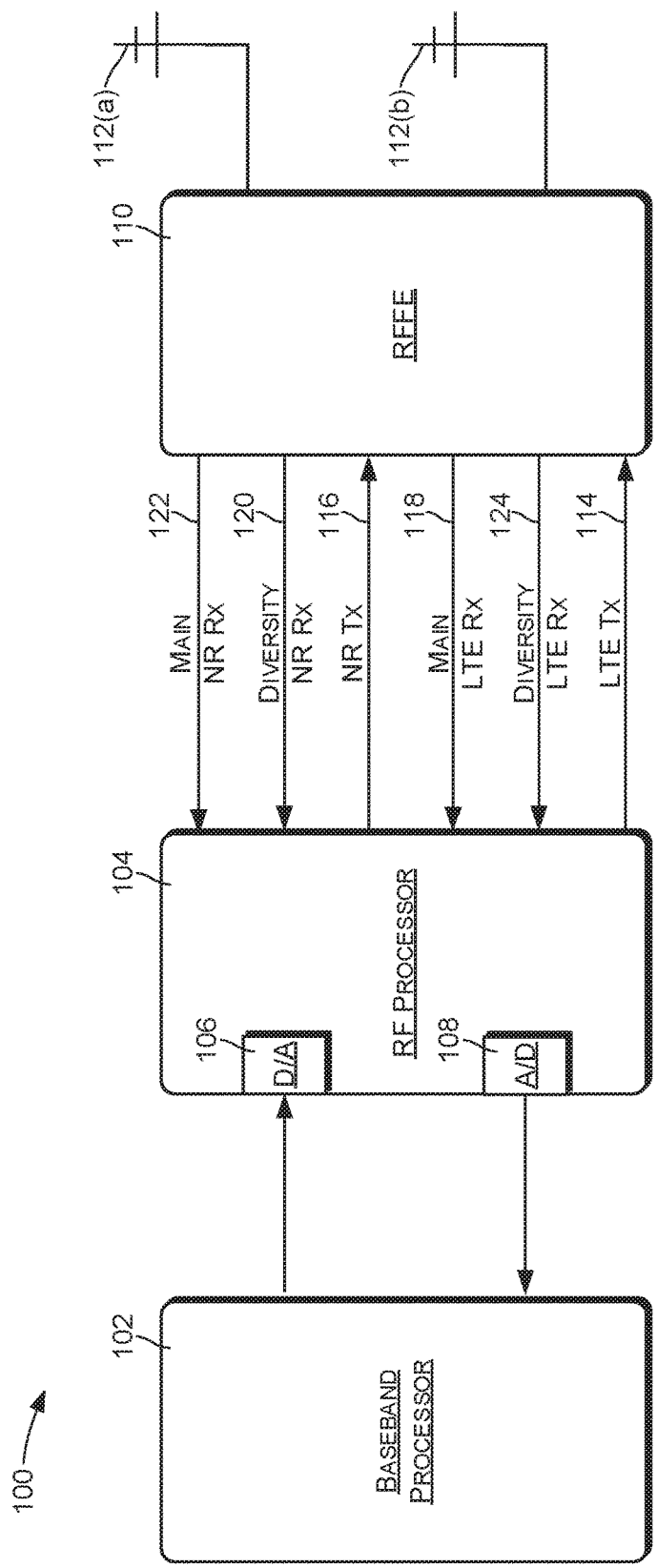
FIG. 1 is a block diagram of a portion of a wireless communication device that implements dual connectivity using 4G and 5G air interfaces.

FIG. 1 illustrates relevant RF components of a wireless telecommunication device 100 for use in a wireless communications network, such as in a cellular communications network. The telecommunication device 100 may comprise a mobile device such as a smartphone or other telephonic handset, a tablet computer, a laptop computer, a monitoring device, etc. Alternatively, the telecommunication device 100 may comprise another type of device, such as a controller, an Internet-of-Things (IoT) device, a home automation component, a wireless access point or hotspot, etc.

The device 100 may be implemented to be used within a cellular or other wireless communication network for communications using 4G and 5G radio access technologies. For 4G, the device 100 supports LTE communications. For 5G, the device 100 supports NR communications.

The components shown in FIG. 1 may be used to implement Dual-Connectivity, for use in a Non-Standalone (NSA) configuration. When using NSA, the device 100 simultaneously establishes an LTE carrier and an NR carrier. The LTE carrier is used for control-plane messaging and for user-plane communications. The NR carrier is used for additional user-plane bandwidth. The components may also be used to implement certain types of carrier aggregation such as may be used in LTE systems.

For purposes of discussion, a 4G or LTE component is a component that performs according to the 4G or LTE communications standard. A 4G or LTE signal or communication is a signal or communication that accords with the 4G or LTE communications standard. A 5G or NR component is a component that performs according to the 5G or NR communications standard. A 5G or NR signal or communication is a signal or communication that accords with the 5G or NR communications standard.

The wireless device 100 has a baseband processor 102 that manages radio functionality and that processes LTE and 5G signaling. The wireless device 100 also has an RF processor 104 that is responsible for RF functions such as conversion between baseband frequencies and RF frequencies. The RF processor 104 receives data from the baseband processor 102 and provides data to the baseband processor 102. This functionality is represented in FIG. 1 as a digital-to-analog (D/A) converter 106 and an analog-to-digital converter (A/D) 108. The RF processor 104 provides and receives RF signals corresponding to both 4G and 5G radio access technologies (e.g., LTE and NR).

The wireless device 100 also has an RF front end (RFFE) 110 that performs amplification and filtering of RF Tx and RF Rx signals. The RFFE 110 in this embodiment transmits and receives on each of two antennas, shown in FIG. 1 as a first antenna 112(a) and a second antenna 112(b).

The RFFE 110 is configured for simultaneous transmission of both LTE and NR signals. The RFFE 110 receives an LTE Tx signal 114 and an NR Tx signal 116 from the RF processor 104. The LTE Tx signal 114 and NR Tx signal 116 are provided simultaneously by the RF processor 104 to the RFFE 110.

The RFFE 110 is also configured for simultaneous reception of LTE and NR signals, with antenna diversity. The RFFE 110 provides a main LTE Rx signal 118 and a diversity LTE Rx signal 124 to the RF processor 104. The RFFE 110 provides a main NR Rx signal 122 and a diversity NR Rx signal 120 to the RF processor 104.

Figure 2:
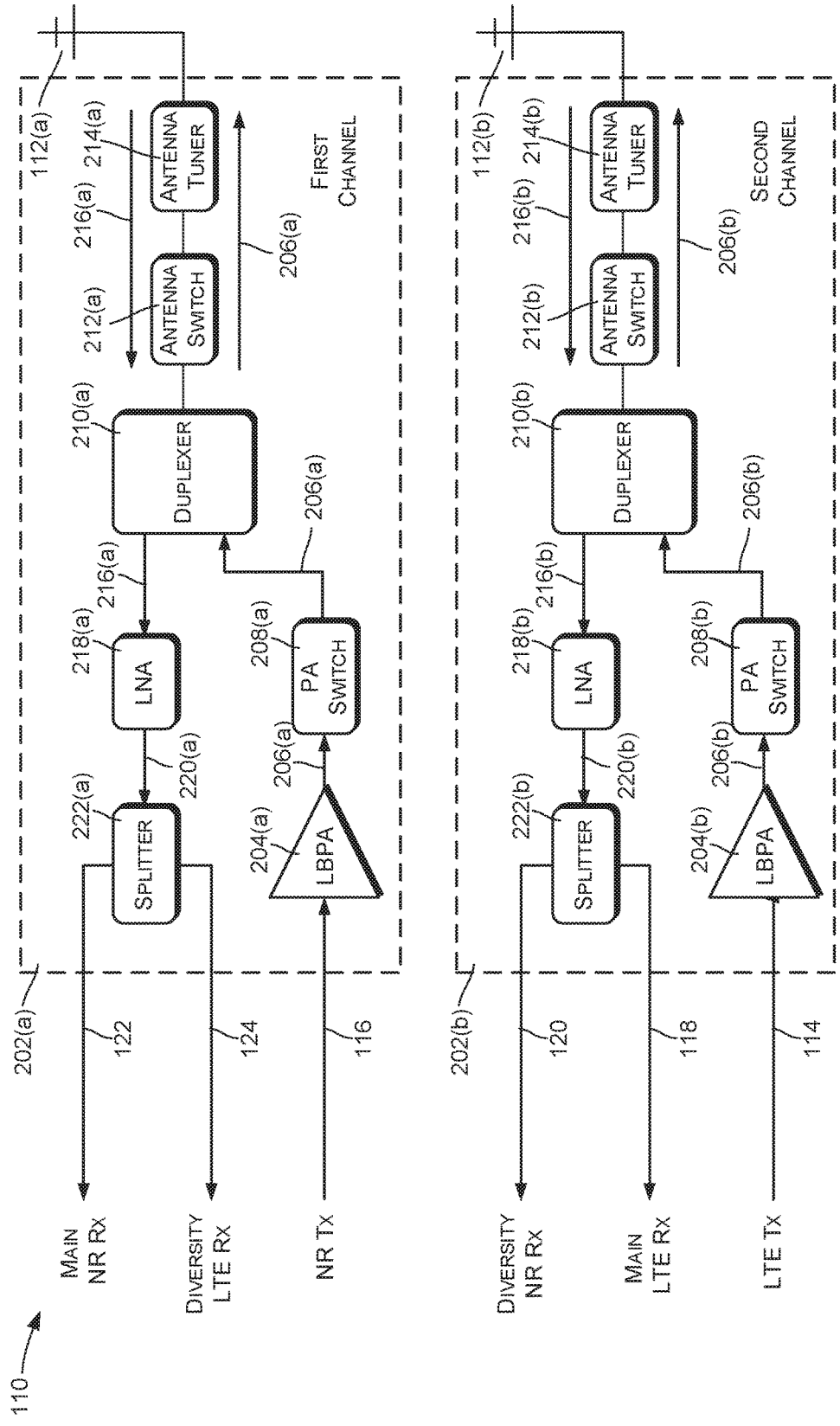
FIG. 2 is a block diagram of an example radio frequency front end that may be used in the device of FIG. 1.

FIG. 2 shows an example implementation of the RFFE 110. The RFFE 110 may be used within a cellular or other wireless communication device for simultaneous LTE and NR communications and/or for other types of carrier aggregation or dual connectivity.

The RFFE 110 has a first channel 202(a) and a second channel 202(b), which in this embodiment have similar components. The first and second channels 202(a) and 202(b), collectively, receive LTE and NR signals from and provide LTE and NR signals to the RF processor 104. Each of the channels 202(a) and 202(b) supports a transmit signal and two receive signals. The channels are designed to operate concurrently. The RFFE 110 supports reception diversity, and therefore produces two receive signals for LTE and two receive signals for NR.

Specifically, in the illustrated embodiment the first channel 202(a) receives the NR transmit (Tx) signal 116 and the second channel 202(b) receives the LTE Tx signal 114. The first channel produces the main NR receive (Rx) signal 122 and the diversity LTE Rx signal 124. The second channel 202(b) produces the main LTE Rx signal 118 and a diversity NR Rx signal 120.

The first channel 202(a) is associated with the first antenna 112(a) and the second channel 202(b) is associated with the second antenna 112(b). The first antenna 112(a) is used for NR transmission and reception, and for LTE diversity reception. The second antenna 112(b) is used for LTE transmission and reception, and for NR diversity reception.

The first channel 202(a) will be described initially, with it being understood that the second channel 202(b) has similar components. Similar components in the two channels are designated by respectively corresponding reference numerals, with the reference numerals being followed by the suffix (a) for components of the first channel 202(a) and by the suffix (b) for components of the second channel 202(b). Signals representing data that will be transmitted from the device 100 are referred to as transmit signals or Tx signals. Signals representing data that are received by the device 100 are referred to as receive or Rx signals.

All signals of FIG. 2 are radio frequency (RF) signals. LTE signals may have a one frequency, and NR signals may have a different frequency. In some embodiments, the LTE and NR signal frequencies may be within the same frequency band or may otherwise have frequencies that differ by a relatively small amount. For example, the LTE and NR signal frequencies may be within a band of frequencies that are designated or regulated for mobile communications, such as the 600 MHz frequency band.

The first channel 202(a) has an output path that is responsive to the NR Tx signal 116 from the RF processor 104. The NR Tx signal 116 is received by a low-band power amplifier (LBPA) 204(a). The LBPA 204(a) amplifies the NR Tx signal 116 to create an amplified NR Tx signal 206(a) for transmission by the first antenna 112(a).

A power amplifier (PA) switch 208(a) provides the amplified NR transmit signal 206(a) to an RF duplexer 210(a). The RF duplexer 210(a) connects the power amplifier 204(a) with the first antenna 112(a). From the RF duplexer 210(a), the amplified NR Tx signal passes through an antenna switch 212(a), through an antenna tuner 214(a), and to the antenna 112(a).

The first channel 202(a) has an input path that is responsive to an Rx signal 216(a), which is received from the antenna 112(a), to produce both LTE and NR Rx signals. The antenna switch 212(a) receives the Rx signal 216(a) from the antenna 112(a). The duplexer 210(a) connects the first antenna 112(a) with a low-noise signal amplifier 218(a). More specifically, the duplexer 210(a) receives the Rx signal 216(a) from the antenna switch 212(a) and passes the Rx signal 216(a) to the low-noise signal amplifier 218(a). The signal amplifier 218(a) amplifies the Rx signal 216(a) to create an amplified antenna signal 220(a). The amplified antenna signal 220(a) is received by a splitter 222(a). The splitter 222(a) processes the amplified antenna signal 220(a) to produce two Rx signals. In the case of the first channel 202(a), the splitter 222(a) produces the main NR Rx signal 122 and the diversity LTE Rx signal 124.

In the described embodiment, the first antenna 112(a) is tuned for the frequency of the NR Tx signal 116 and the second antenna 112(b) is tuned for the frequency of the LTE Tx signal. More specifically, the antenna tuner 214(a) of the first channel 202(a) is dynamically configured or optimized for the frequency of the NR Tx signal 116, and the antenna tuner 214(b) of the second channel 202(b) is dynamically configured or optimized for the frequency of the LTE Tx signal 114.

The second channel 202(b) has the same design as the first channel 202(a), although it is applied to different signals and may be tuned or optimized differently. The output path of the second channel 202(b) is responsive to the LTE Tx signal 114 from the RF processor 104. The LTE Tx signal 114 is received by a low-band power amplifier 204(b). The LBPA 204(b) amplifies the LTE Tx signal 114 to create an amplified LTE Tx signal 206(b) for transmission by the second antenna 112(b).

A PA switch 208(b) provides the amplified LTE transmit signal 206(b) to an RF duplexer 210(b). The RF duplexer 210(b) connects the power amplifier 204(b) with the second antenna 112(b). From the RF duplexer 210, the amplified LTE Tx signal passes through an antenna switch 212(b), through an antenna tuner 214(b), and to the second antenna 112(b). The antenna tuner 214(b) of the second channel 202(b) is dynamically configured or optimized for the frequency of the LTE Tx signal 114.

The input path of the second channel 202(b) is responsive to an Rx signal 216(b), which is received from the second antenna 112(b), to produce both LTE and NR Rx signals. The antenna switch 212(b) receives the Rx signal 216(b) from the antenna 112(b). The duplexer 210(b) receives the Rx signal 216(b) from the antenna switch 212(b) and passes the Rx signal 216(b) to the low-noise signal amplifier 218(b). The signal amplifier 218(b) amplifies the Rx signal 216(b) to create an amplified antenna signal 220(b). The amplified antenna signal 220(b) is received by a splitter 222(b). The splitter 222(b) processes the amplified antenna signal 220(b) to produce two Rx signals. In the case of the second channel 202(b), the splitter 222(b) produces the main LTE Rx signal 118 and the diversity NR Rx signal 120.

Figure 3:
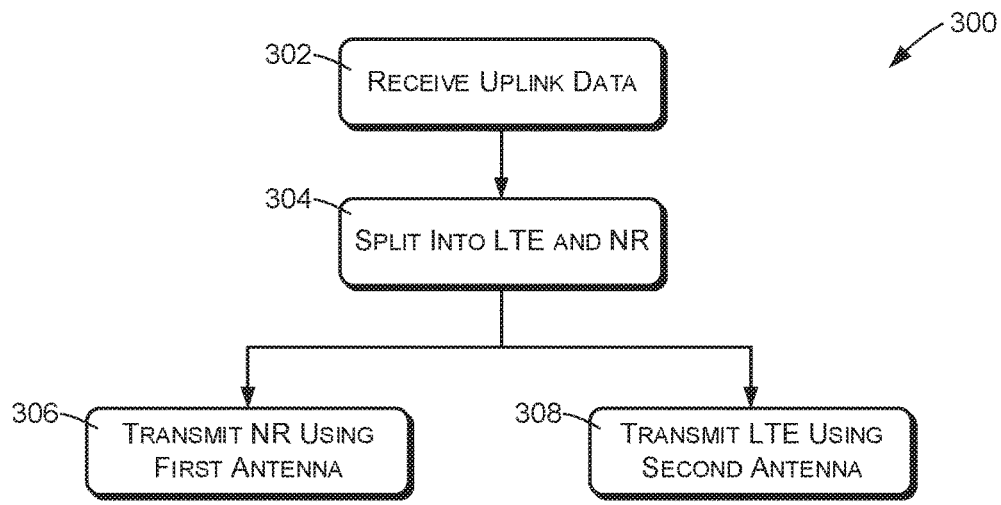
FIG. 3 is a flow diagram illustrating an example method of transmitting data signals using dual connectivity.

FIG. 3 illustrates an example method 300 of transmitting dual-connectivity uplink data. The example method 300 may be performed by a telecommunication device having an RFFE such as the RFFE 110 shown in FIGS. 1 and 2.

An action 302 comprises receiving uplink data that is to be transmitted to a one or more wireless base stations. Uplink data may be received from the baseband processor 102 of FIG. 1, for example, or by components upstream of the baseband processor.

An action 304, which may be performed by the RF processor 104 of FIG. 1, comprises splitting the uplink data into LTE and NR data streams.

An action 306 and an action 308 may be performed simultaneously based on the LTE and NR data streams. The action 306 comprises transmitting a first Tx signal using a first antenna, where the first transmit signal represents the NR portion of the uplink data, formatted and transmitted in accordance with NR radio access technology. The action 308 comprises transmitting a second Tx signal using a second antenna, where the second Tx signal represents the LTE portion of the uplink data and is formatted and transmitted in accordance with LTE radio access technology.

Figure 4:
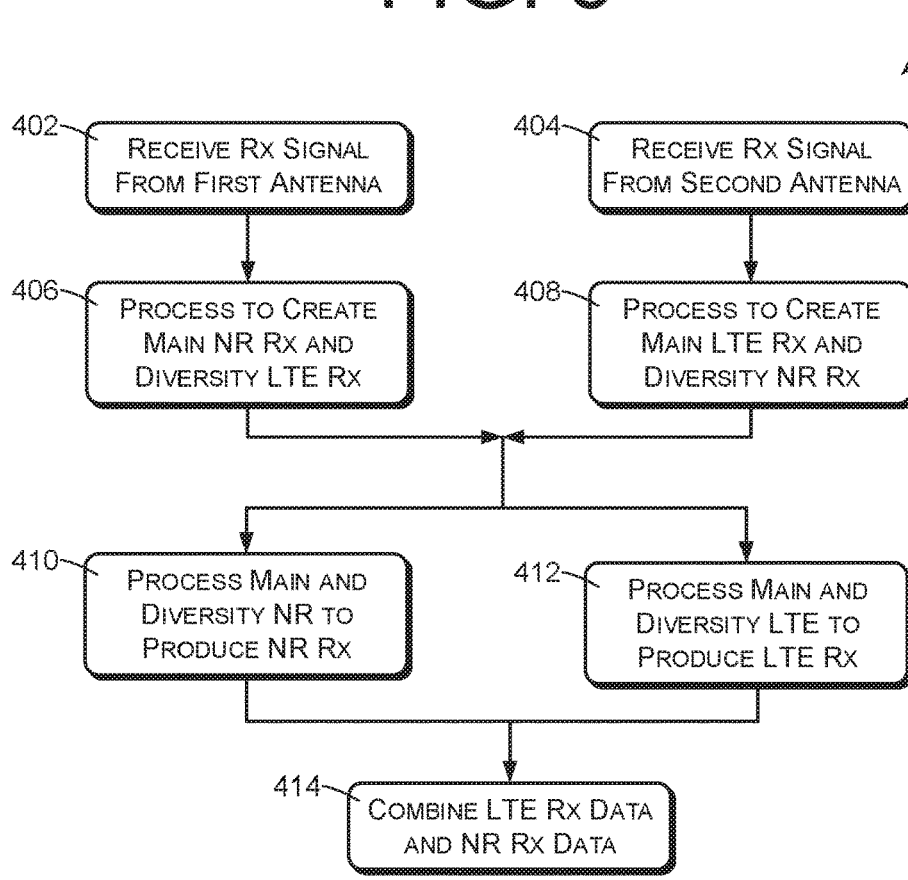
FIG. 4 is a block diagram illustrating an example method of receiving data signals using dual connectivity.

FIG. 4 illustrates an example method 400 of receiving dual-connectivity downlink data. The example method may be performed by a telecommunication device having an RFFE such as the RFFE 110 shown in FIGS. 1 and 2. The example method 400 may be performed simultaneously with the example method 300 of FIG. 3.

An action 402 comprises receiving a first Rx signal from a first antenna. An action 404, which may be performed simultaneously with the action 402, comprises receiving a second Rx signal from a second antenna. It is assumed for purposes of discussion that each of the first and second Rx signals contains both an LTE signal and an NR signal.

An action 406 comprises processing the first Rx signal to produce a main NR Rx signal and a diversity LTE Rx signal, wherein the main NR Rx signal represents downlink data in accordance with NR radio access technology and the diversity LTE Rx signal represents downlink data in accordance with LTE radio access technology.

An action 408, which may be performed simultaneously with the action 406, comprises processing the second Rx signal to produce a main LTE Rx signal and a diversity NR Rx signal, wherein the main LTE Rx signal represents downlink data in accordance with LTE radio access technology and the diversity NR Rx signal represents downlink data in accordance with NR radio access technology.

An action 410 comprises processing the main NR Rx signal and the diversity NR Rx signal to produce a processed NR Rx signal. An action 412, which may be performed simultaneously with the action 410, comprises processing the main LTE Rx signal and the diversity LTE signal to produce a processed LTE Rx signal.

An action 414 comprises aggregating LTE Rx data and NR Rx data represented by the processed LTE Rx signal and the NR Rx signal to create a downlink data stream.

Figure 5:
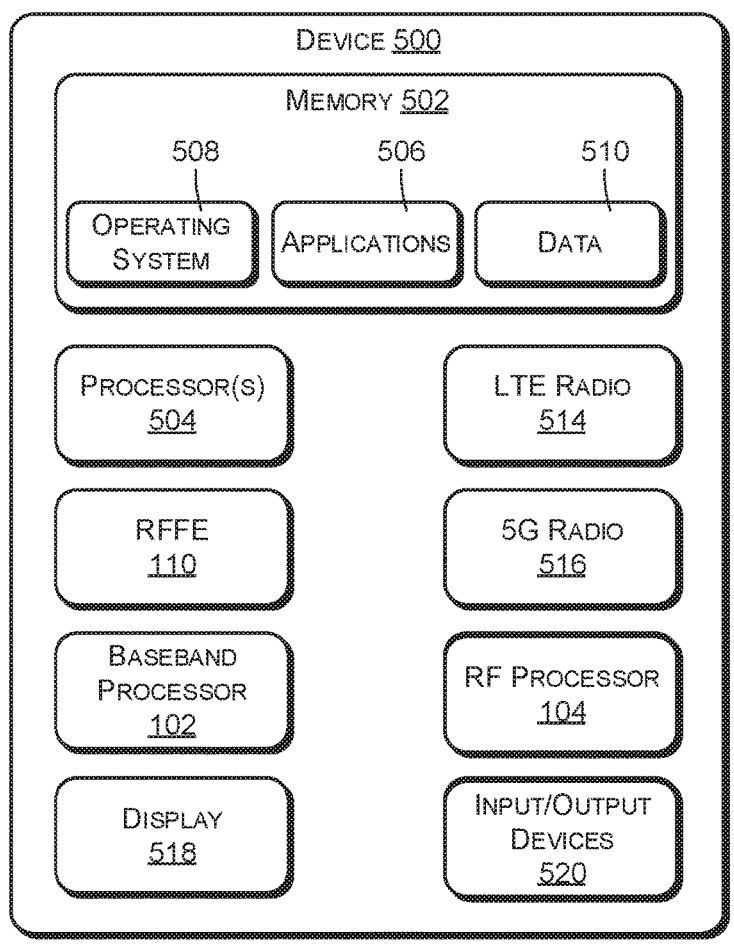
FIG. 5 is a block diagram of an example mobile communication device.

FIG. 5 illustrates an example mobile communication device 500 that may be used to implement the techniques described herein. The method 300 of FIG. 3 and the method 400 of FIG. 4, for example, may be implemented by a device such as the device 500.

FIG. 5 shows only basic, high-level components of the device 500. Generally, the communication device 500 may comprise any of various types of cellular communication devices that are capable of wireless data and/or voice communications, including smartphones and other mobile devices, "Internet-of-Things" (IoT) devices, smarthome devices, computers, wearable devices, entertainment devices, industrial control equipment, etc. In some environments, the communication device 500 may be referred to as a user equipment (UE) or mobile station (MS).

The device 500 may include memory 502 and a processor 504. The memory 502 may include both volatile memory and non-volatile memory. The memory 502 can also be described as non-transitory computer-readable media or machine-readable storage memory, and may include removable and non-removable media implemented in any method or technology for storage of information, such as computer executable instructions, data structures, program modules, or other data. Additionally, in some embodiments the memory 502 may include a SIM (subscriber identity module), which is a removable smart card used to identify a user of the device 500 to a service provider network.

The memory 502 may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information. The memory 502 may in some cases include storage media used to transfer or distribute instructions, applications, and/or data. In some cases, the memory 502 may include data storage that is accessed remotely, such as network-attached storage that the device 500 accesses over some type of data communications network.

The memory 502 stores one or more sets of computer-executable instructions (e.g., software) such as programs that embody operating logic for implementing and/or performing desired functionality of the device 500. The instructions may also reside at least partially within the processor 504 during execution thereof by the device 500. Generally, the instructions stored in the computer-readable storage media may include various applications 506 that are executed by the processor 504, an operating system (OS) 508 that is also executed by the processor 504, and data 510 associated with the applications 506 and/or the operating system 508.

In some embodiments, the processor(s) 504 is a central processing unit (CPU), a graphics processing unit (GPU), both CPU and GPU, or other processing unit or component known in the art. Furthermore, the processor(s) 504 may include any number of processors and/or processing cores. The processor(s) 504 is configured to retrieve and execute instructions from the memory 502.

The device 500 may also have an LTE radio 514 and a 5G radio 516, which may be used as described above for implementing dual connectivity. The device 500 includes the baseband processor 102, the RF processor 104, and the RFEE 110 described above, which form part of and/or are used by the LTE and 5G radios for signal transmission and reception.

The device 500 may have a display 518, which may comprise a liquid crystal display or any other type of display commonly used in telemobile devices or other portable devices. For example, the display 518 may be a touch-sensitive display screen, which may also act as an input device or keypad, such as for providing a soft-key keyboard, navigation buttons, or the like.

The device 500 may have input and output devices 520. These devices may include any sort of output devices known in the art, such as a display (already described as display 518), speakers, a vibrating mechanism, or a tactile feedback mechanism. Output devices may also include ports for one or more peripheral devices, such as headphones, peripheral speakers, or a peripheral display. Input devices may include any sort of input devices known in the art. For example, the input devices may include a microphone, a keyboard/keypad, or a touch-sensitive display (such as the touch-sensitive display screen described above). A keyboard/keypad may be a push button numeric dialing pad (such as on a typical telemobile device), a multi-key keyboard (such as a conventional QWERTY keyboard), or one or more other types of keys or buttons, and may also include a joystick-like controller and/or designated navigation buttons, or the like.

Although features and/or methodological acts are described above, it is to be understood that the appended claims are not necessarily limited to those features or acts. Rather, the features and acts described above are disclosed as example forms of implementing the claims.

What is claimed is:

1. A telecommunication device comprising:
   one or more processors configured to receive uplink data and split the uplink data into a first data stream associated with a first radio access technology and a second data stream associated with a second radio access technology; and
   a radio frequency (RF) front end comprising:
      a first power amplifier that amplifies a first RF transmit signal to create a first amplified RF transmit signal for transmission by a first antenna, wherein the first RF transmit signal represents at least a portion of the first data stream and is formatted and transmitted in accordance with the first radio access technology;
      a second power amplifier that amplifies a second RF transmit signal to create a second amplified RF transmit signal for transmission by a second antenna concurrently with the transmission of the first RF transmit signal by the first antenna, wherein the second RF transmit signal represents at least a portion of the second data stream and is formatted and transmitted in accordance with the second radio access technology;
      a first signal amplifier that amplifies a first RF receive signal from the first antenna to create a first amplified RF receive signal;
      a first signal splitter that processes the first RF receive signal to produce a first main RF signal and a first diversity RF signal, wherein the first main RF signal represents data in accordance with the first radio access technology and the first diversity RF signal represents data in accordance with the second radio access technology;
      a second signal amplifier that amplifies a second RF receive signal from the second antenna to create a second amplified RF receive signal; and
      a second signal splitter that processes the second amplified RF receive signal to produce a second main RF signal and a second diversity RF signal, wherein the second main RF signal represents data in accordance with the second radio access technology and the second diversity RF signal represents data in accordance with the first radio access technology,
   wherein the one or more processors are further configured to:
      receive the first main RF signal, the first diversity RF signal, the second main RF signal, and the second diversity RF signal,
      generate, from the first main RF signal and the second diversity RF signal, a first processed RF signal representing data in accordance with the first radio access technology,
      generate, from the second main RF signal and the first diversity RF signal, a second processed RF signal representing data in accordance with the second radio access technology, and
      aggregate the data represented by the first processed RF signal and the data represented by the second processed RF signal to create a data stream.

2. The telecommunication device of claim 1, wherein the first radio access technology comprises a 5th Generation (5G) radio access technology and the second radio access technology comprises a 4th Generation (4G) radio access technology.

3. The telecommunication device of claim 1, wherein the first and second RF transmit signals are received concurrently by the radio frequency front end.

4. The telecommunication device of claim 1, wherein:
   the first RF transmit signal has a first frequency;
   the second RF transmit signal has a second frequency; and
   the first frequency and the second frequency are within a band of frequencies that are designated for mobile device communications.

5. The telecommunication device of claim 1, wherein the first RF transmit signal has a first frequency and the second RF transmit signal has a second frequency, the radio frequency front end further comprising:
   a first antenna tuner associated with the first antenna, the first antenna tuner being configured for the first frequency; and
   a second antenna tuner associated with the second antenna, the second antenna tuner being configured for the second frequency.

6. The telecommunication device of claim 1, further comprising:
   a first duplexer that connects the first power amplifier and the first signal amplifier with the first antenna; and
   a second duplexer that connects the second power amplifier and the second signal amplifier with the second antenna.

7. A wireless communication device, comprising:
   first and second antennas;

a radio frequency (RF) processor that (a) determines, from received data, a first data stream comprising first data in accordance with a first radio access technology and a second data stream comprising second data in accordance with a second radio access technology and (b) simultaneously provides first and second RF transmit signals, wherein the first RF transmit signal represents the first data stream and the second RF transmit signal represents the second data stream;

a first power amplifier that amplifies the first RF transmit signal to create a first amplified RF transmit signal for transmission from the first antenna; and a second power amplifier that amplifies the second RF transmit signal to create a second amplified RF transmit signal for transmission from the second antenna concurrently with transmission of the first amplified RF transmit signal from the first antenna.

8. The wireless communication device of claim 7, wherein the first radio access technology comprises a 5th Generation (5G) radio access technology and the second radio access technology comprises a 4th Generation (4G) radio access technology, and the received data comprises uplink data.

9. The wireless communication device of claim 7, wherein:
the first RF transmit signal has a first frequency;
the second RF transmit signal has a second frequency; and
the first frequency and the second frequency are within a band of frequencies that are designated for mobile device communications.

10. The wireless communication device of claim 7, further comprising:
a first duplexer that connects the first power amplifier and the first signal amplifier with the first antenna; and
a second duplexer that connects the second power amplifier and the second signal amplifier with the second antenna.

11. The wireless communication device of claim 7, further comprising a signal amplifier that amplifies an RF receive signal from the first antenna to create an amplified RF receive signal, wherein the amplified RF receive signal represents data in accordance with the first radio access technology and data in accordance with the second radio access technology.

12. The wireless communication device of claim 7, further comprising:
a signal amplifier that amplifies an RF receive signal from the first antenna to create an amplified RF receive signal, wherein the amplified RF receive signal represents data in accordance with the second radio access technology; and
a duplexer that connects the first power amplifier and the signal amplifier with the first antenna.

13. The wireless communication device of claim 7, wherein the first RF transmit signal has a first frequency and the second RF transmit signal has a second frequency, the wireless communication device further comprising:
a first antenna tuner associated with the first antenna, the first antenna tuner being configured for the first frequency; and
a second antenna tuner associated with the second antenna, the second antenna tuner being configured for the second frequency.

14. The wireless communication device of claim 7, further comprising:

a first signal amplifier that amplifies a first RF receive signal from the first antenna to create a first amplified RF receive signal;

a first signal splitter that processes the first RF receive signal to produce a first main RF signal and a first diversity RF signal, wherein the first main RF signal represents data in accordance with the first radio access technology and the first diversity RF signal represents data in accordance with the second radio access technology;

a second signal amplifier that amplifies a second RF receive signal from the second antenna to create a second amplified RF receive signal; and a second signal splitter that processes the second amplified RF receive signal to produce a second main RF signal and a second diversity RF signal, wherein the second main RF signal is in accordance with the second radio access technology and the second diversity RF signal is in accordance with the first radio access technology wherein the RF processor further generates a first processed signal from the first main RF signal and the second diversity RF signal, generates a second processed signal from the second main RF signal and the first diversity RF signal, and aggregates first radio access technology data represented by the first processed signal and second radio access technology data represented by the second processed signal the second processed signal to create a data stream.

15. A method performed by a telecommunication device, comprising:
receiving uplink data to be transmitted to one or more wireless base stations;
simultaneously (a) transmitting a first transmit signal using a first antenna, and (b) transmitting a second transmit signal using a second antenna, wherein the first transmit signal represents a first portion of the uplink data in accordance with a first radio access technology and the second transmit signal represents a second portion of the uplink data in accordance with a second radio access technology;
receiving a first RF receive signal from the first antenna;
processing the first RF receive signal to produce a first main RF signal and a first diversity RF signal, wherein the first main RF signal represents first data in accordance with the first radio access technology and the first diversity RF signal represents second data in accordance with the second radio access technology;
receiving a second RF receive signal from the second antenna; and
processing the second RF receive signal to produce a second main RF signal and a second diversity RF signal, wherein the second main RF signal represents third data in accordance with the second radio access technology and the second diversity RF signal represents fourth data in accordance with the first radio access technology.

16. The method of claim 15, wherein:
the first transmit signal has a first frequency;
and the second transmit signal has a second frequency;
the first antenna is tuned for the first frequency; and
the second antenna is tuned for the second frequency.

17. The method of claim 15, wherein the first radio access technology comprises a 5th Generation (5G) radio access technology and the second radio access technology comprises a 4th Generation (4G) radio access technology.

18. The method of claim 15, the first RF signal representing downlink data in accordance with the first radio access technology.

19. The method of claim 15, further comprising aggregating (a) the first data and the fourth data in accordance with the first radio access technology and (b) the second data and the third data in accordance with the second radio access technology, to create a data stream.

20. The method of claim 19, wherein the processing the first RF receive signal and the processing the second RF receive signal are performed substantially simultaneously and the data stream comprises a downlink data stream.

* * * * *